Figure 1:
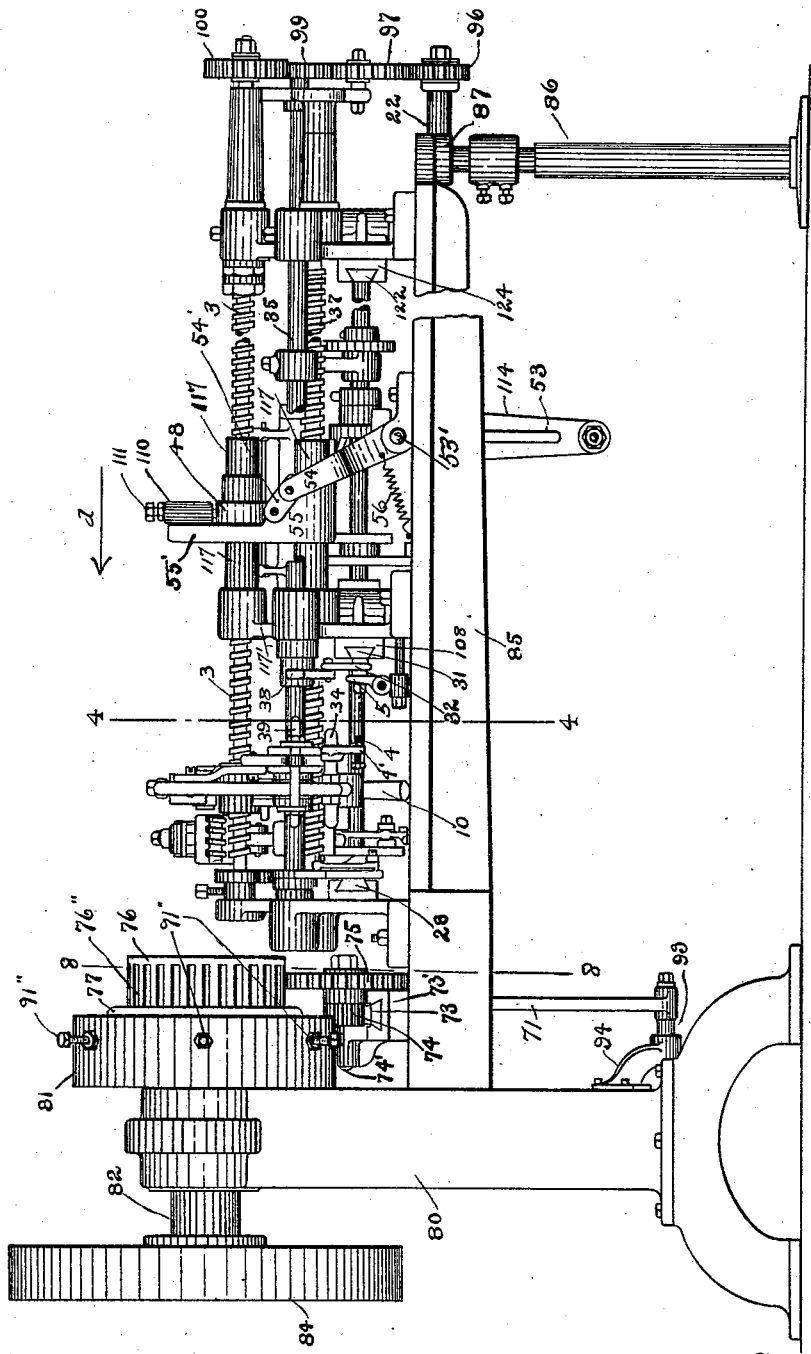

(No Model.) 8 Sheets—Sheet 1.

E. J. WATSON & E. W. VAUGHAN.
MACHINE FOR MANUFACTURE OF SWAGED WIRE SPOKES.

No. 543,914. Patented Aug. 6, 1895.

Witnesses
Harry C. Armstrong
Robert T. Gallagher

Inventors
Edwin J. Watson
Edwin W. Vaughan
By Attorney
John C. Dewey (No Model.) 8 Sheets—Sheet 3.

E. J. WATSON & E. W. VAUGHAN.
MACHINE FOR MANUFACTURE OF SWAGED WIRE SPOKES.

No. 543,914. Patented Aug. 6, 1895.

Witnesses
Harry C. Armstrong
Robert J. Gallagher

Inventors
Edwin J. Watson
Edwin W. Vaughan
By Attorney
John C. Dewey (No Model.) 8 Sheets—Sheet 4.
E. J. WATSON & E. W. VAUGHAN.
MACHINE FOR MANUFACTURE OF SWAGED WIRE SPOKES.
No. 543,914. Patented Aug. 6, 1895.
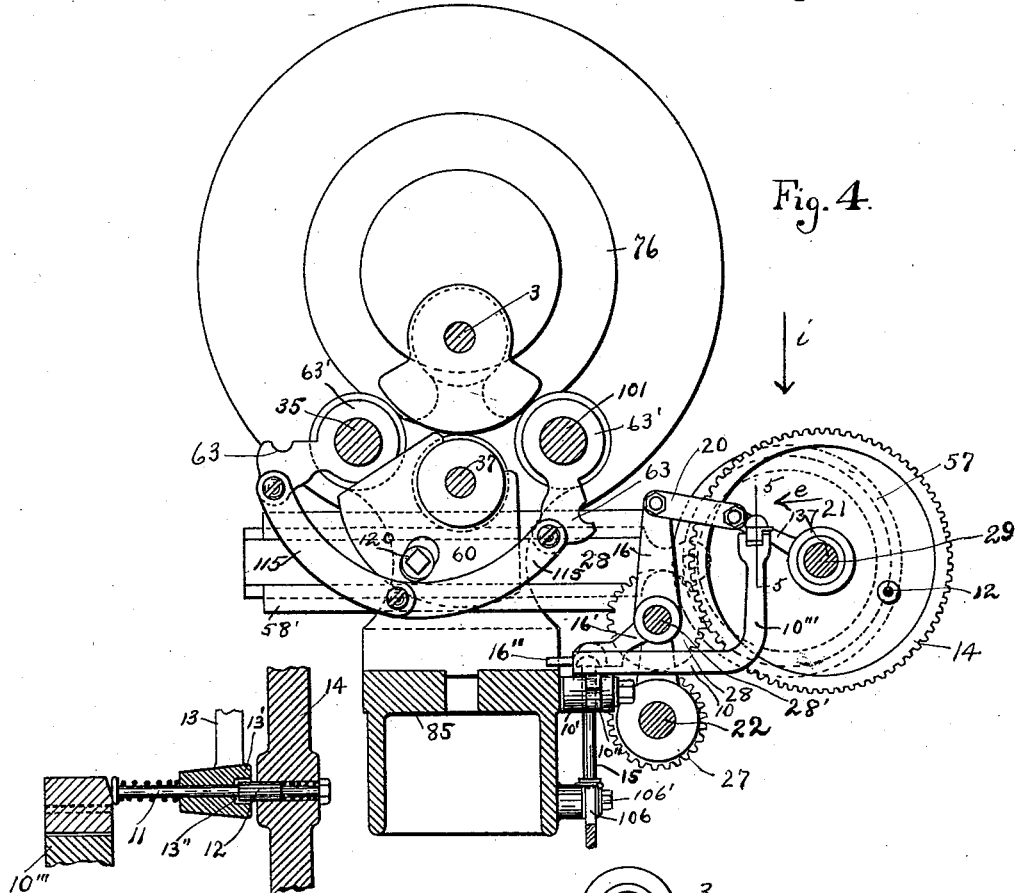
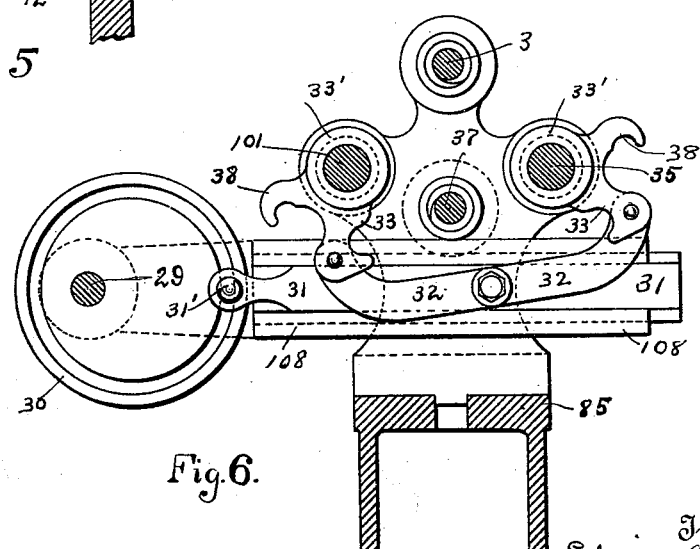
Witnesses
Harry C. Armstrong
Robert T. Gallagher
Inventors
Edwin J. Watson
Edwin W. Vaughan
By Attorney
John C. Dewey (No Model.) 8 Sheets—Sheet 5.

E. J. WATSON & E. W. VAUGHAN.
MACHINE FOR MANUFACTURE OF SWAGED WIRE SPOKES.

No. 543,914. Patented Aug. 6, 1895.

Witnesses
Harry C. Armstrong
Robert T. Gallagher

Inventors
Edwin J. Watson
Edwin W. Vaughan
By Attorney
John C. Dewey (No Model.) 8 Sheets—Sheet 6.

E. J. WATSON & E. W. VAUGHAN.
MACHINE FOR MANUFACTURE OF SWAGED WIRE SPOKES.

No. 543,914. Patented Aug. 6, 1895.

Witnesses
Harry C. Armstrong
Robert T. Gallagher

Inventors
Edwin J. Watson
Edwin W. Vaughan
By Attorney
John C. Dewey

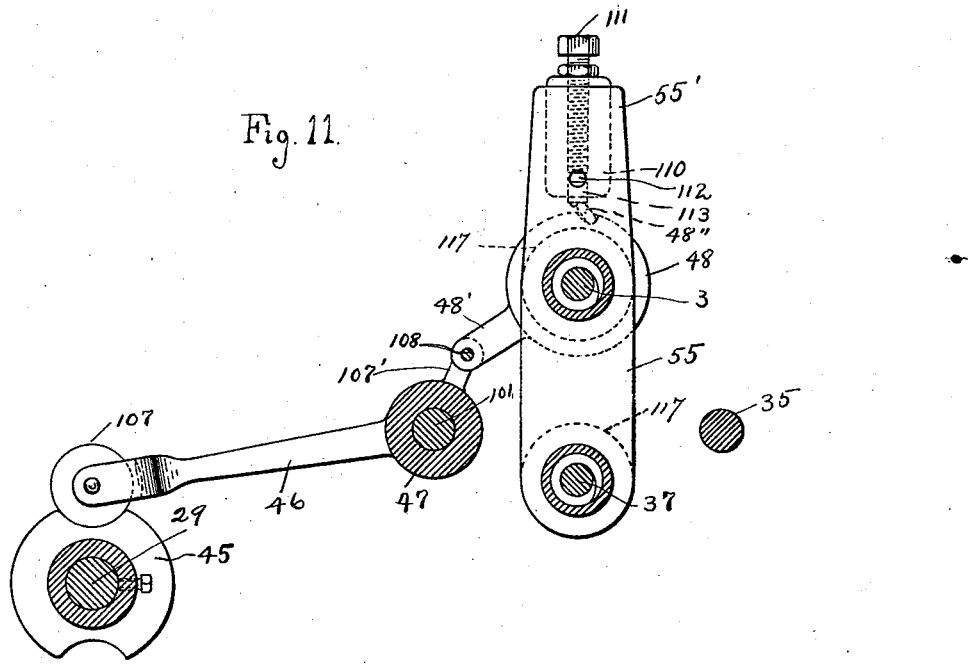
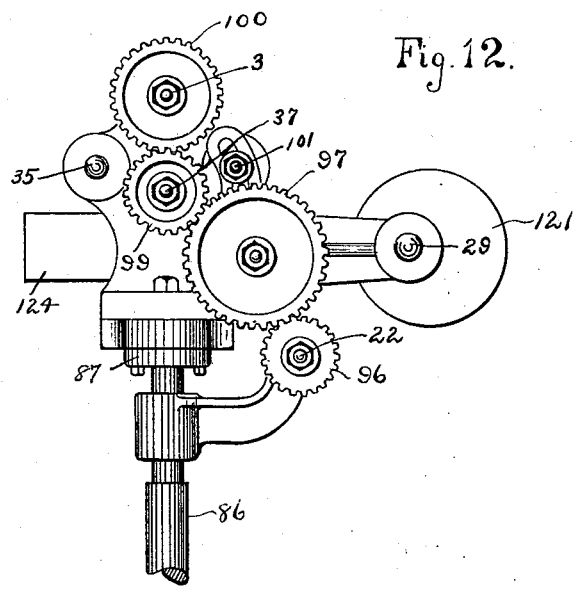

(No Model.) 8 Sheets—Sheet 8.
E. J. WATSON & E. W. VAUGHAN.
MACHINE FOR MANUFACTURE OF SWAGED WIRE SPOKES.

No. 543,914. Patented Aug. 6, 1895.

Witnesses
Harry C. Armstrong
Robert T. Gallagher

Inventors
Edwin J. Watson
Edwin W. Vaughan
By Attorney
John C. Dewey

United States Patent Office.

EDWIN J. WATSON AND EDWIN W. VAUGHAN, OF WORCESTER, MASSACHU-SETTS, ASSIGNORS TO THE WASHBURN & MOEN MANUFACTURING COMPANY, OF SAME PLACE.

MACHINE FOR MANUFACTURE OF SWAGED-WIRE SPOKES.

SPECIFICATION forming part of Letters Patent No. 543,914, dated August 6, 1895.

Application filed March 31, 1893. Serial No. 468,510. (No model.)

*To all whom it may concern:*

Be it known that we, EDWIN J. WATSON and EDWIN W. VAUGHAN, citizens of the United States, residing at Worcester, in the county of Worcester and State of Massachusetts, have invented certain new and useful Improvements in Machines for the Manufacture of Swaged-Wire Spokes; and we do hereby declare that the following is a full, clear, and exact description of the invention, which, in connection with the drawings making a part of this specification, will enable others skilled in the art to which our invention belongs to make and use the same.

Our invention relates to the manufacture of swaged-wire bicycle or other spokes from a continuous wire or from lengths of wire longer than a single spoke, in which the full diameter of the wire is left at regular intervals for the attaching ends of the spokes when the wire is cut into lengths and the intermediate portion between the wire is swaged.

The object of our invention is to improve upon the method of manufacturing swaged-wire bicycle or other spokes as ordinarily practiced, and to provide an automatic power-machine for manufacturing said spokes from a reel of wire or from lengths of wire longer than a single spoke.

Our invention consists in certain novel features of construction and operation of a machine for swaging wire bicycle or other spokes, and more particularly in combining with the swaging mechanism, provided with dies for effecting the swaging, mechanism for gripping and drawing the wire continuously through between the swaging-dies, as will be hereinafter fully described.

We have shown in the drawings our machine combined with the swaging-dies and operating mechanism, of substantially the description shown in United States Patent No. 52,493, dated February 6, 1866, with some changes, to be hereinafter described.

Figure 2:
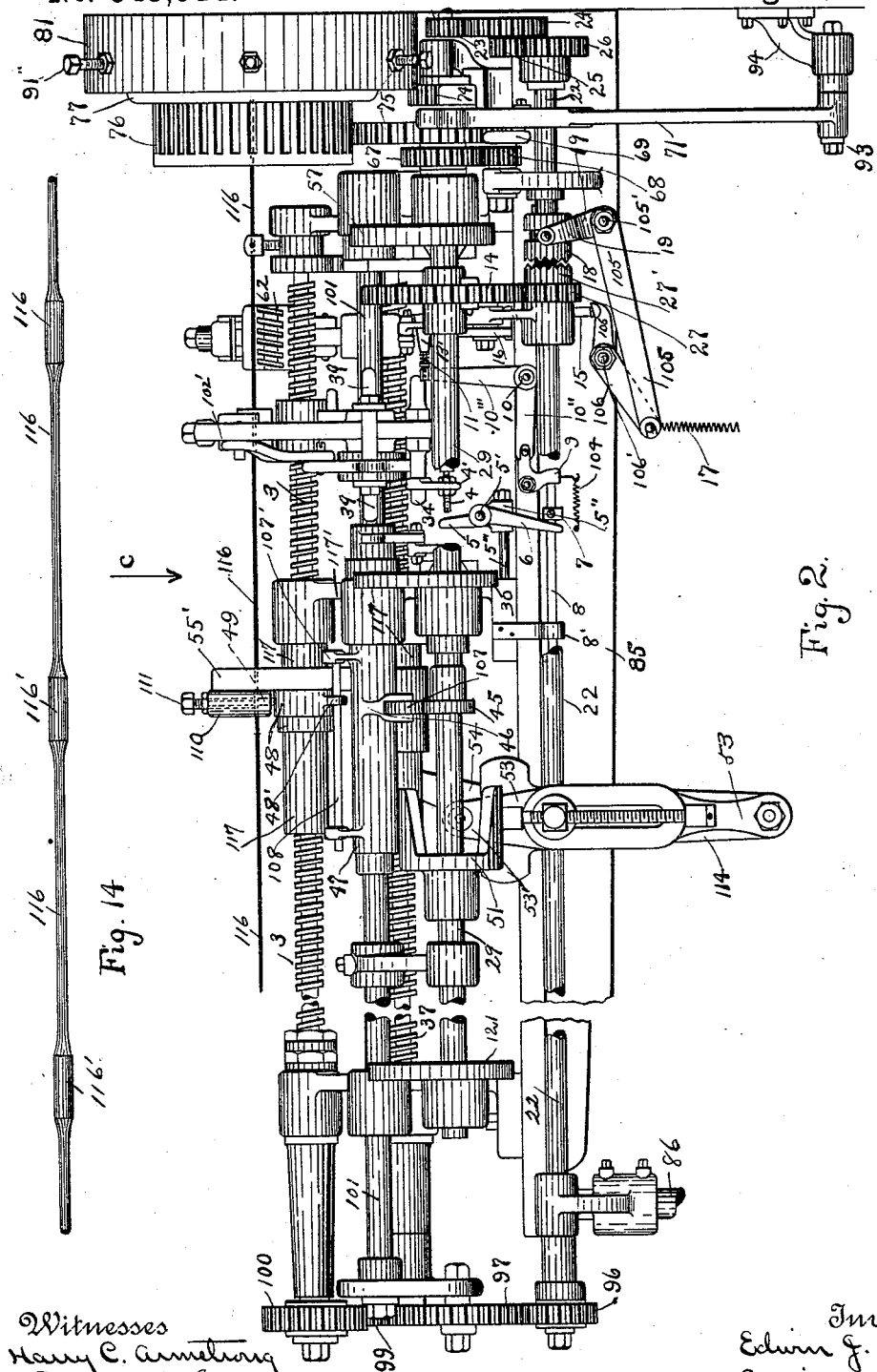
Figure 3:
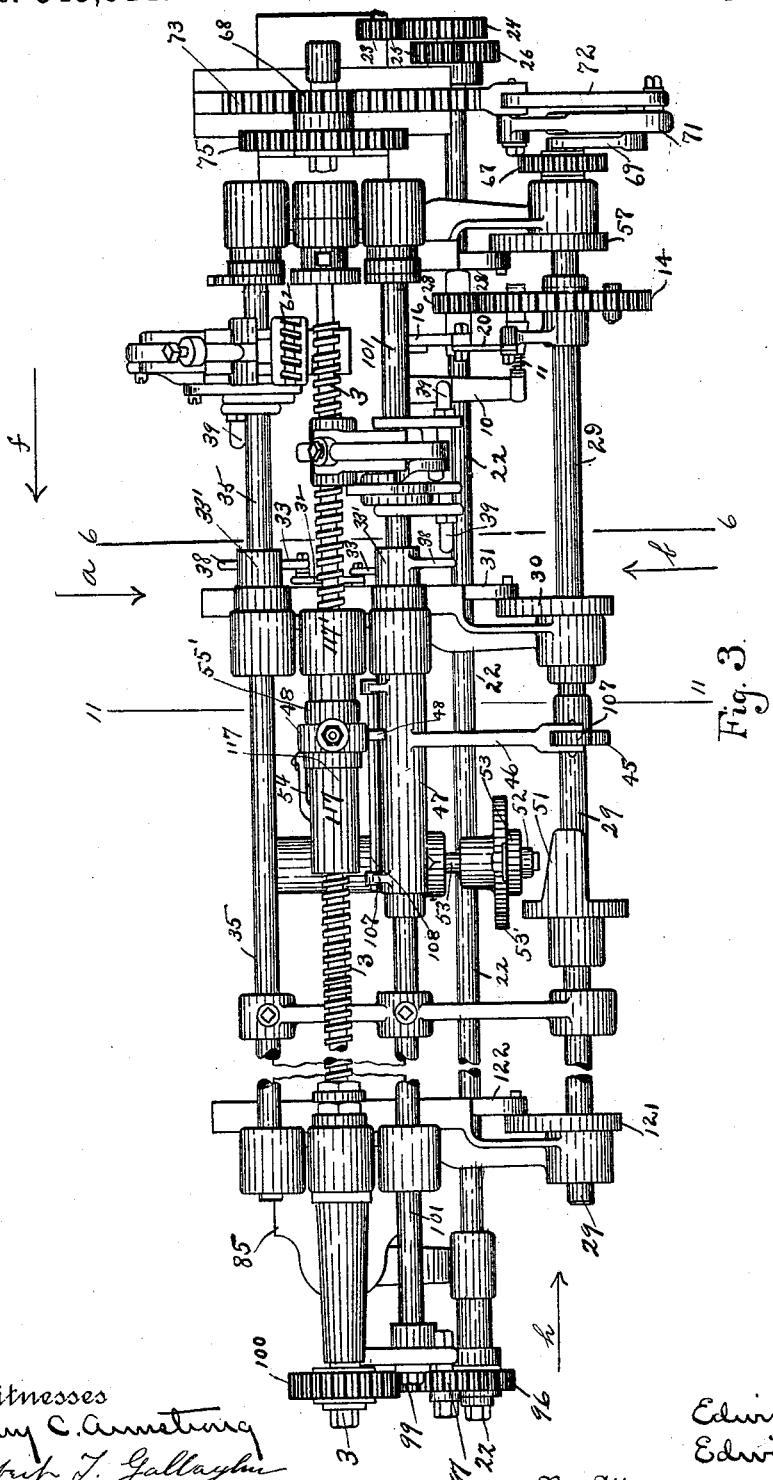
Figure 7:
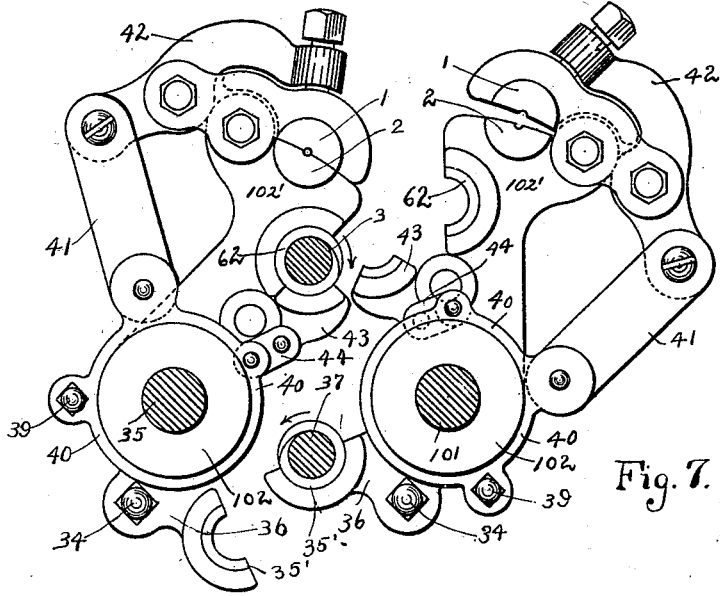
Figure 8:
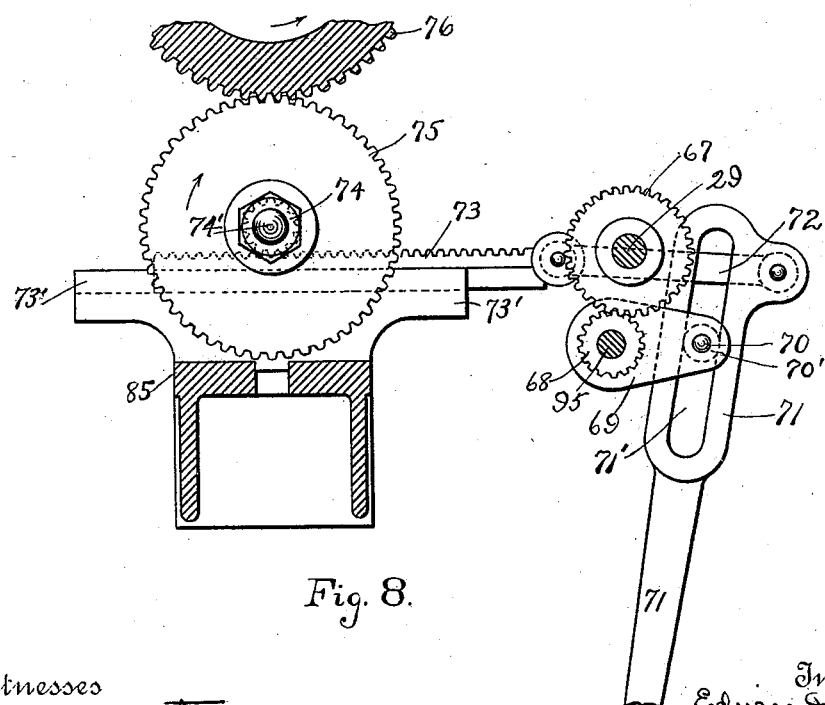
Figure 9:
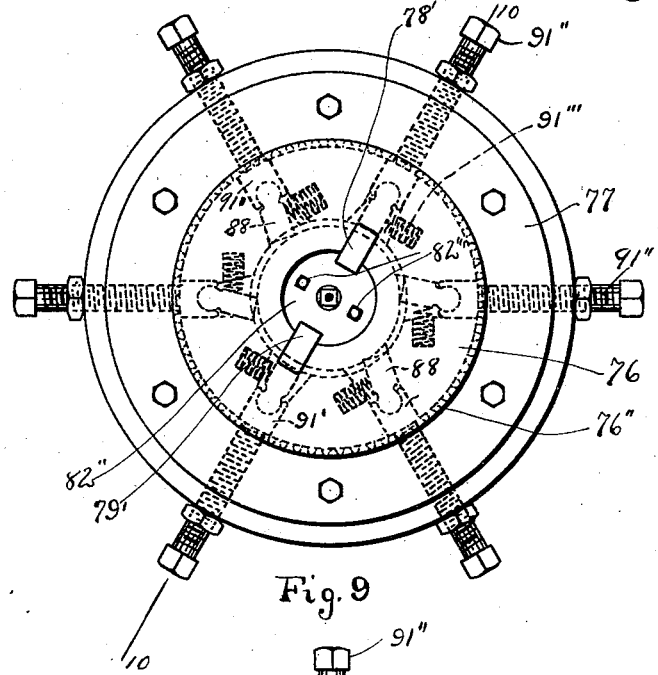
Figure 10:
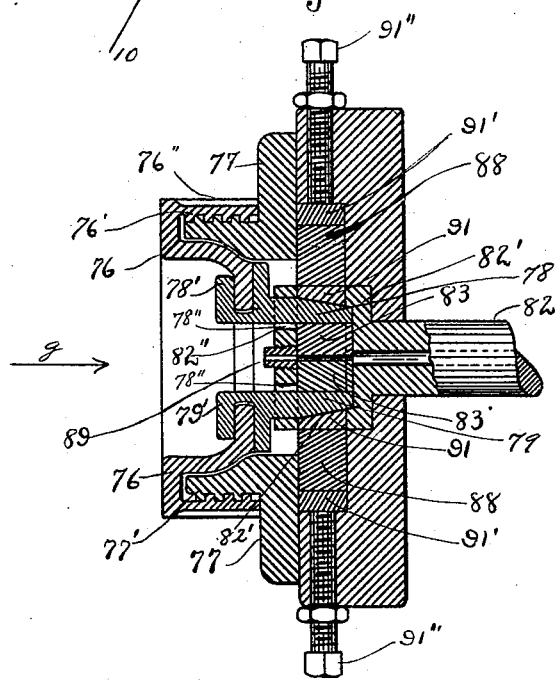
Figure 13:
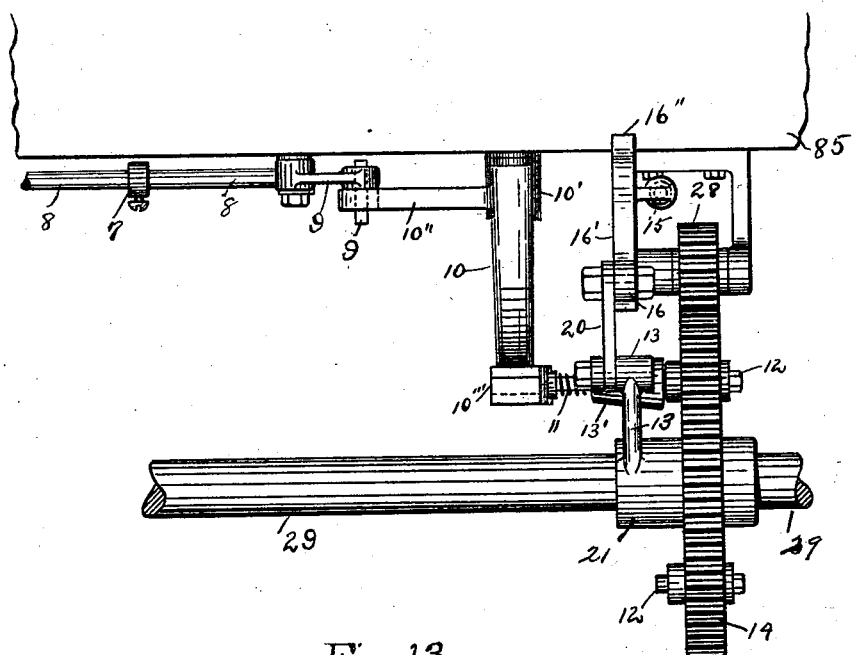

Referring to the drawings, Figure 1 is a front elevation of our machine for swaging wire bicycle-spokes, looking in the direction of arrow $a$, Fig. 3. Fig. 2 is a rear elevation looking in the direction of arrow $b$, Fig. 3, with the driving-pulley and supporting-stand of the swaging mechanism (shown in Fig. 1) left off. Fig. 3 is a plan view of the parts shown in Fig. 2, looking in the direction of arrow $c$, same figure, with the swaging mechanism proper left off. Fig. 4 is a vertical cross-section on line 4 4, Fig. 1, looking in the direction of arrow $d$, same figure. The travelers which grip the wire and some other parts are not shown in this figure, but the mechanism for automatically operating the travelers moving toward the swaging mechanism at the end of their travel to cause the same to grip the wire and also a portion of the mechanism for operating the travelers moving away from the swaging mechanism at the end of their travel to cause the same to release the wire is more particularly shown, as will be hereinafter fully described. Fig. 5 is, on an enlarged scale, a sectional detail taken at line 5 5, Fig. 4, looking in the direction of arrow $e$, same figure, showing a detached portion of the automatic releasing mechanism. Fig. 6 is a vertical cross-section on line 6 6, Fig. 3, looking in the direction of arrow $f$, same figure. Said figure shows additional mechanism to that shown in Fig. 4 for operating the travelers to cause them to release the wire at the end of their travel from the swaging mechanism and to engage the screw-threaded shaft to return toward the swaging mechanism. Some of the parts are left off in this figure for the sake of clearness. Fig. 7 is a detail of the travelers, which grip and draw the wire along during the swaging operation. Fig. 8 is a vertical cross-section taken on line 8 8, Fig. 1, looking in the direction of arrow $d$, same figure, showing the mechanism for automatically opening and closing the swaging-dies. Some of the parts are left off in this figure for the sake of clearness. Fig. 9 is an end view of the swaging-head detached, looking in the direction of arrow $g$, Fig. 10. Fig. 10 is a vertical section on line 10 10, Fig. 9. Fig. 11 is a detail of the wire-gripping mechanism, taken on line 11 11, Fig. 3, looking in the direction of arrow $f$, same figure. Said gripping mechanism grips the wire to be drawn through between the swaging-dies during the cessation of the swaging operation. Fig. 12 is an end view of the gearing at the end of the machine, lookin the direction of arrow $d$, Fig. 1, and arrow $h$, Fig. 3. Fig. 13 is, on an enlarged scale, a plan view of the automatic releasing mechanism shown at the right in Fig. 4, looking in the direction of arrow $i$, same figure. Fig. 14 is a section of the wire after the same is swaged. Figs. 2 to 14, inclusive, are shown on an enlarged scale.

In the accompanying drawings the part marked 80, Fig. 1, is a stand secured to the floor, upon the upper end of which is supported the shell 81 of the swaging-machine, and the hollow rotating shaft 82, having the head 82', carrying the swaging-dies 83 on one end thereof, and the driving-pulley 84 fast on the other end thereof. (See Figs. 1, 9, and 10.)

The bed 85 of the machine, upon which are supported the operative parts of the mechanisms for drawing the wire through the swaging-machine and for opening and closing the swaging-dies, is supported at one end upon the stand 80 and at the other end upon a stand or pillar 86, which in this instance is provided with an adjusting-collar 87 to level the bed 85, as desired.

We will now proceed to describe the swaging mechanism, which in this instance is somewhat similar to the swaging mechanism shown in the Patent No. 52,493, before referred to.

The swaging mechanism consists of the stationary shell 81, (see Fig. 10,) made of circular shape, and within said shell there is supported a series of toggle-blocks 88, formed so as to act and close the swaging-dies and return to their normal position in substantially the same manner as shown in said patent.

In the head 82' are supported a pair of swaging-dies 83 and two followers 91, one for each die. The followers and dies are retained in place in the head 82' by a plate 82'', secured to the head 82' by screws 82'''. (See Fig. 9.) A short tube 89 is screwed into a hole in the center of said plate 82'', as shown in Figs. 9 and 10, through which the wire to be swaged passes.

In the shell 81 are recesses which receive the toggle-blocks 88, the inner ends of which are adapted to engage the followers 91, which engage the wedges between the followers 91 and the dies 83, and the outer ends of said toggle-blocks are made circular to set against and extend within corresponding recesses in the blocks 91'.

The adjusting-screws 91'' are supported in the shell 81, with their inner ends bearing against the blocks 91'. Springs 91'''' extend within cavities in the shell 81 and tend to press the toggle-blocks 88 to one side of the cavity in which they are contained, so that as the shaft 82 revolves and the followers 91 come in contact with the ends of the toggle-blocks 88 successively they move said toggle-blocks to the right against the action of the spring, forcing inwardly the followers 91 and the dies 83 to swage or hammer the wire extending between the dies, and as the shaft 82 continues to revolve the followers 91 pass by the moving end of the toggle-blocks 88, and the springs 91''' move said blocks 88 back to their normal position to engage the followers when they come around again, in substantially the manner described in said patent referred to.

Six toggle-blocks 88 are shown in the drawings, Fig. 9, but we may use more or less, if preferred.

A plate 77, secured to the face of the shell 81, retains the toggle-blocks 88 and the blocks 91' in position in the shell 81. The plate 77 is provided with an external screw 77', upon which is mounted to revolve in either direction the gear 76, having an internal screw 76' to engage the screw 77' and an external gear-surface 76'' to mesh with and be driven by a gear 75, driven by mechanism to be hereinafter described.

Between the swaging-dies 83 and the followers 91, in this instance, extend the wedges 78 and 79. Said wedges extend loosely through holes 78'' in the plate 82'', (see Fig. 9,) and the outer ends thereof are provided with yoke-shaped ends 78' and 79', which extend over an inward-projecting flange 76''' on the gear 76, as clearly shown in Fig. 10.

It will be seen that the turning of the gear 76 in one direction will cause it to be screwed off of the plate 77 and will cause the wedges 78 and 79 to be withdrawn from between the swaging-dies 83 and followers 91, thus allowing the swaging-dies to be opened, and the rotation of the gear 76 in the opposite direction will cause said gear 76 to be screwed onto the plate 77, to cause the wedges 78 and 79 to be pushed in between the swaging-dies 83 and the followers 91 and force the swaging-dies together.

When the swaging-dies are open the wire is free to be drawn through between the swaging-dies without being acted on by said dies and without stopping the machine, and when the dies are moved toward each other or closed they act on the wire as it is drawn through the swaging-machine.

The operation of the swaging mechanism is familiar. The toggle-blocks 88 coming in contact with the followers 91 as the head 82' fast on the shaft 82 is revolved causes the dies 83, engaged by the wedges 78 and 79, inserted between the followers 91 and said dies, to be forced inwardly to swage the wire in the ordinary way.

The gear 75, which engages and revolves the gear 76 first in one direction and then in the other to screw it on or off the plate 77 to open and close the dies, as above described, is fast on a spindle 74', supported in bearings on the bed 85, (see Figs. 1 and 8,) and a pinion 74 fast on the same spindle meshes with and is driven by a rack 73 supported in ways 73' on the bed of the machine. One end of said rack 73 is connected by a link 72 to the upper slotted end of the arm 71, which is pivoted at its lower end on a pin 93, fast in a bracket 94, bolted to the stand 80. (See Figs. 1 and 2.) The upper end of the arm 71 is provided with a slot 71', in which travels a friction-roller 70' on a pin 70 on the crank-arm 69, fast on a shaft 95. (See Fig. 8.) Also fast on said shaft 95 is a pinion 68, which meshes with and is driven by a gear 67, fast on the shaft 29. It will thus be seen that by the rotation of the shaft 29, which has a regular intermittent rotation in the manner to be hereinafter described, through gear 67, pinion 65, crank 69, and roll 70' extending in the slot 71' in the arm 71, and link 72 a reciprocating motion is communicated to the rack 73, and through pinion 74 and gear 75 the gear 76 is rotated at regular intervals, first in one direction to withdraw the wedges 78 and 79 and allow the wire to be drawn through the swaging-machine without being acted on by the swaging-dies 83, and then in the other direction to push in the wedges and cause the swaging-dies to act on the wire.

The construction and arrangement of the mechanism for automatically opening and closing the swaging-dies (shown in Figs. 8 and 10) are such that the swaging-dies will be automatically opened at regular intervals after a certain portion of the wire has been swaged, to allow the wire to be drawn through the swaging-machine without being swaged, and then closed, preparatory to the swaging of another portion without stopping the machine.

We will now proceed to describe the mechanism for gripping the wire and drawing it through between the swaging-dies during the swaging operation. In this instance the gripping mechanism consists of two devices of similar construction provided with gripping surfaces or jaws, which are automatically closed and opened to grip the wire and to release the same. Said devices are termed "travelers" and are supported and have a reciprocating longitudinal motion on stationary rods extending lengthwise of the machine. The travelers are moved back and forth by half-nut or screw-threaded portions on said travelers engaging with screw-threaded shafts, which shafts have a continuous rotary motion. When one of the travelers grips and draws the wire through the swaging-machine, the other traveler is moved back toward the swaging-machine preparatory to gripping the wire when the other traveler has reached the limit of its travel and releases the wire, and vice versa. By employing two travelers or devices for gripping the wire to draw it through the swaging-machine during the swaging operation no time is lost, for when one traveler has reached the end of its travel away from the swaging-machine the other traveler has returned to the swaging-machine and is ready at the proper time to grip the wire. Thus the machine operates continuously.

The shaft 22 is the driving-shaft of the machine and operates through intervening mechanism the several parts of the machine. Said shaft 22 is journaled in bearings on the bed of the machine and is driven in this instance by a system of gears 23, 24, 25, and 26, as shown in Figs. 2 and 3, which gears are driven by a separate belt. (Not shown.)

The shaft 22 is provided with a gear 96 at its outer end, which meshes with and drives a gear 97, which in turn meshes with and drives a gear 99 fast on a screw-threaded shaft 37, and said gear 99 meshes with and drives a gear 100 fast on the screw-threaded shaft 3. (See Figs. 1, 2, 3, and 12.) It will thus be seen that a continuous rotary motion is communicated from the shaft 22, through the system of gears 96, 97, 99, and 100, to the screw-threaded shafts 37 and 3, which move the travelers back and forth.

In Figs. 4, 5, 6, and 7 detail views of the travelers and their operating mechanism are shown. One of the travelers is supported and adapted to move longitudinally and to rotate on the stationary rod 35 secured in stands on the bed 85, and the other traveler is supported and adapted to move longitudinally and to rotate on the stationary rod 101, also supported in stands on the bed 85. The two travelers are of similar construction and each is provided with gripping-jaws to grip the wire and is adapted to have a rocking motion on its supporting-rod to cause the half-nut portions thereon to engage with one screw-threaded shaft 3 or the other screw-threaded shaft 37, according as the traveler is to be moved away from or toward the swaging-machine. Each traveler consists of the hub portion 102, adapted to slide on the supporting-rod 35 or 101, and also to rock on said rod, and the rigid arm 102' extending out from the hub and provided with a half-nut portion 62, adapted to engage, in connection with the half-nut portion 43 hinged on the arm 102', the upper screw-threaded shaft 3, as shown at the left in Fig. 7, to cause the traveler to be moved along by the revolution of said shaft and draw the wire through the swaging-machine.

In the upper end of the arm 102' is secured a die, forming the stationary jaw 2, and extending out from the lower portion of the hub 102 is a rigid arm 36, provided with a half-nut 36', which is adapted to engage the lower screw-threaded shaft 37 when the traveler is disconnected from the upper screw-threaded shaft 3, as shown at the right in Fig. 7, to cause the traveler to be moved toward the swaging-machine by the revolution of said screw-threaded shaft 37.

The arm 36 is provided with studs 34 extending out from opposite sides thereof, which are engaged by mechanism, to be hereinafter described, to rock the traveler on its supporting-rod and cause it to engage with the screw-threaded shaft 3 or the screw-threaded shaft 37.

Mounted on the hub 102 is a sleeve 40, adapted to move with said hub and to have an independent rotary motion on said hub. A link 41 connects the sleeve 40 with the outer end of the lever 42, pivoted in the arm 102' of the traveler, and carrying at its inner end a block forming the movable jaw 1 of the gripping-jaw. A link 44 connects the sleeve 40 with the nut portion 43, to operate said nut portion by the rotation of said sleeve. Studs 39 extend from opposite sides of the sleeve 40, by means of which, through mechanism to be hereinafter described, the sleeve 40 is rotated on the hub 102 of the traveler to move the lever 42 through link 41 and open the gripping-jaw 1, as shown at the right in Fig. 7, or close the gripping-jaw, as shown at the left in Fig. 7.

We will now describe the mechanism for operating the traveler at the end of its travel away from the swaging-machine to cause it to release the wire and to engage the screw-threaded shaft 37, by which it is returned toward the swaging-machine.

Supposing the wire to be gripped by the jaws 1 and 2 of the traveler at the left in Fig. 7, the traveler is carried along to the left by the revolution of the screw-shaft 3 (see Fig. 2) until the proper length of wire has been swaged in the swaging-machine. Then the adjustable screw 4, supported in the arm 4', secured upon the forward stud 34 in the lower arm 36 of the traveler, (see Fig. 2,) will strike against the tripping-arm 5 on the spindle 5', mounted in an arm 5" supported on a pin 5'" secured to the bed, as shown in Fig. 2. The movement of the arm 5 will cause the oppositely-extending arm 6, fast on said spindle 5', to strike against the collar 7, fast on the rod 8, mounted to slide longitudinally in an arm 8', as shown in Fig. 2. The movement of the rod 8, the end of which bears against the end of the bell-crank lever 9, will move said lever against the action of the spring 104, and also move the three-armed lever 10 provided with a hub 10' and pivoted on a pin 117, (see Figs. 4 and 13,) and having one arm 10" connected to the bell-crank lever 9, and its upwardly-extending arm 10'" bearing against a spring-actuated pin 11, supported in the enlarged portion 13' of the arm 13, which arm is provided with the hub 21 mounted loosely on the shaft 29. (See Figs. 4, 5, and 13.)

The gear 14, fast on the shaft 29, is provided with two spring-actuated pins 12 upon opposite sides of the shaft 29, which pins act, in connection with the recess 13" in the portion 13' of the arm 13, into which the pins 12 extend, as shown in Fig. 5, to lock the gear 14 to the arm 13 and hold the shaft 29, except when the spring-actuated pin 12 is moved inwardly and disengaged from the arm 13.

The movement of the lever 10, as above described, pushes in the spring-actuated pin 11, the inner end of which bears against the outer end of the spring-actuated pin 12, (see Fig. 5,) and also pushes in said pin 12 to disconnect the same from the arm 13 and leave the gear 14 free to turn and with it the shaft 29.

Motion is communicated to the gear 14 from the driving-shaft 22 through gears 27 and 28 by the clutch member 18, splined to said shaft, so as to rotate therewith and move longitudinally thereon. (See Fig. 2.)

The clutch member 18 is adapted to engage with the clutch member 27' on the gear 27, loose on the shaft 22, and is operated by a fork 19, secured on the end of the arm 105, pivoted at 105', and a double-armed lever 106, pivoted at 106' and connected at its outer end to the other end of the arm 105 through the action of the spring 17, secured to the outer end of said lever 106. (See Figs. 2 and 4.)

In order to prevent the operation of the clutch mechanism by the action of the spring 17, except at the proper time, a rod 15 (see Figs. 2 and 4) is adapted to bear at its lower end against the inner end of the lever 106 and with its other end bears against the foot 16' of the lever 16, mounted on the shaft 28' of the gear 28. (See Fig. 4.) The upper end of the lever 16 is connected by a link 20 with the projecting end of the arm 13, extending out from the hub 21, supported loosely on the shaft 29, as above described. (See Fig. 12.)

The spring-actuated pin 12, connecting the gear 14 with the arm 13, as shown in Figs. 5 and 13 and above described, prevents any motion of the gear 14, except when the pin 12 is disconnected from said gear.

When the spring-actuated pin 12 is disconnected from the arm 13, as above described, it releases the arm 13 and allows the vertical moving rod 15 to move upwardly through the action of the spring 17 against the foot 16' on the lever 16 and rock said lever on its supporting-shaft 28 and through link 20 rotate the hub 21 of the arm 13 on the shaft 29, thus allowing the arm 105 and fork 19 to operate the clutch 18 and cause the gear 27, clutched to the shaft 22, to rotate through gear 28 the gear 14 and the shaft 29 and operate the mechanism connected with said shaft.

When the gear 14 has made a half-revolution, the oppositely-arranged spring actuated pin 12 will engage the recess 13" in the portion 13' of the arm 13 and rock or throw over said arm in the direction indicated by arrow e, Fig. 4, and cause the lever 16 through link 20 to be moved on its pivot-point and the foot 16' thereof to bear against the upper end of the rod 15 and move down said rod and through lever 106 operate the arm 105, carrying the fork 19, against the action of the spring 17 to open the clutch and disconnect the gear 27.

A projecting end 16", extending out from the foot 16' of the lever 16, which engages the upper end of the rod 15, as shown in Figs. 4 and 13, strikes against the bed or frame 85 and limits the motion of the lever 16 and holds said lever 16 and through link 20 the arm 13 and gear 14 connected with said arm by the spring-actuated pin 12, as above described.

The half-revolution of the shaft 29 in the manner above described operates through connections with said shaft the different parts of the machine and produces in proper order the following results: the opening and closing of the swaging-dies in the manner above described, the releasing of the wire by one of the travelers and the gripping of the wire by the other traveler, and the rotation of said travelers to cause one to engage the screw-shaft 37 to be moved toward the swaging-machine and the other to engage the screw-shaft 3 to be moved away from the swaging-machine, and also the gripping of the wire to draw the same through the swaging-machine during the cessation of the swaging operation.

We will first describe the mechanism for operating the traveler which has reached the end of its travel away from the swaging-machine to cause it to release the wire and to be rotated on its supporting-rod to engage the screw-threaded shaft 37, by which it is returned toward the swaging-head. Said mechanism is shown more particularly in Figs. 3 and 6, and consists of a cam 30 fast on the shaft 29 and connected with a slide 31 by a pin 31' extending into a groove in the face of the cam. Said slide 31 is supported and moves in a horizontal plane in ways 108 supported on the bed of the machine. (See Fig. 6.) On said slide 31 is pivoted a double-armed lever 32, each end of which is connected with a hook-arm 33 extending out from a collar 33' loose on the supporting-rods 35 and 101. A second hook-arm 38 also extends out from said collar. The half-revolution of the shaft 29 causes the cam 30, fast thereon, to make a half-revolution and draws the slide 31 to the left, Fig. 6, causing the hook 33 to catch over the projecting stud 34 on the traveler supported on the rod 35, which traveler at this time would be at the end of its travel away from the swaging-machine and in a position for the stud 34 to be engaged by the hook 33. The engagement of the hook 33 with the stud 34 rotates the traveler on its supporting-rod and causes the nut portion 62 thereon to be disengaged from the screw-threaded shaft 3 and at the same time the nut portion 36 thereon to be engaged with the screw-threaded shaft 37, as shown at the right in Fig. 7. Just before the hook 33 engages the stud 34 the hook 38 engages the stud 39 on the sleeve 40 and rotates said sleeve on the hub 102 of the traveler, causing the movable jaw 1 to be opened preparatory to again gripping the wire and the nut portion 43 to be disengaged from the screw-shaft 3 through link 44.

It will be understood by referring to Fig. 6 that the second half-rotation of the cam 30, when the shaft 29 receives the last half of its rotation, will move the slide 31 in the opposite direction to cause the hooks 33 and 38 at the left in said Fig. 6 to operate the traveler supported on the rod 101 when it reaches the end of its travel away from the swaging-head in the same manner as described above in connection with the traveler supported on rod 35.

When the clamping-dies are open and the wire 116 is free to be drawn through the swaging-machine during the cessation of the swaging operation for a distance equal to the desired length 116' of wire between the swaged portions, as shown in Fig. 14, mechanism for gripping the wire and drawing it quickly through the swaging-machine is employed. Said mechanism, as above stated, is operated from the shaft 29, and is shown in Figs. 1, 2, 3, and 11, and consists of a cam 45, fast on said shaft 29, adapted to act on a roll 107 at the end of arm 46, extending out from a sleeve 47, supported on a rod 101. The sleeve 47 carries a rod 108, secured in the ends of arm 107' extending out from said sleeve 47, (see Fig. 2,) and said rod extends loosely through the end of an arm 48' extending out from a collar 48, supported and rotating on a tube 117 encircling the screw-threaded shaft 3, Figs. 2, 3, and 11.

A slide 55, mounted loosely on the tubes 117, secured in the stand 117', (see Figs. 1 and 2,) has the upwardly-extending portion 55', which is provided with a box 110 extending upon one side thereof and directly over the collar 48, as shown in Figs. 1 and 11. In the box 110 is a bolt 111, the lower end of which reaches to a hole 112 extending through the arm 55' and the box 110, as shown in Figs. 2 and 11. The wire 116 to be operated on extends through said hole. (See Fig. 2.) Below the hole 112 in the box 110 is supported a gripping-pin 113, which is acted on by a pin 48'', supported in the collar 48, as shown in Fig. 11.

It will be seen by referring to Fig. 11 that a half-rotation of the cam 45 through roll 107, arm 46, sleeve 47, and rod 108 will operate the collar 48 through arm 48' and cause the pin 48'' thereon to engage and push upwardly the pin 113 to grip the wire between said pin and the end of the bolt 111. After the wire is gripped, as above described, the slide 55, carrying the gripping mechanism, is moved along to draw the wire through the swaging-machine by a cam 51 on shaft 29, (see Fig. 3,) striking against the roll 52 upon the upper end of the lever 53, pivoted at its lower end upon an arm 114, secured to the bed of the machine. (See Fig. 2.) The lever 53 is connected with one end of a rock-shaft 53', supported on the bed of the machine, and upon the other end of said rock-shaft 53' is secured the lower end of the lever 54, (see Fig. 1,) and the movement of said lever 53 through the rock-shaft 53' moves the lever 54 and the slide 55, connected with said lever 55 by a link 54', to the right in Fig. 1 against the action of the spring 56, carrying the gripping device supported on said slide and above described with it, and thus drawing the wire through the swaging-machine for the length of the travel of said slide, which may be varied as desired.

When the wire has been drawn through the swaging-machine, the cam 45 operates through the intervening mechanism above described to release the gripping-pin 113 from the wire, and the spring 56 acts to return the slide 55 to its first position. (See Fig. 1). After the the wire has been drawn through the swaging-machine as above described, the traveler next to the swaging end of the machine is operated to cause it to engage the screw-threaded shaft 3 and to grip the wire by the cam 57 fast on the shaft 29, (see Fig. 4,) which makes a half-revolution, which pulls the slide 28, carrying a pin engaging the cam-groove and supported in ways 58', to the right, and moves the pivoted plate 60, connected with said slide by a slot-and-bolt connection, as shown at 120 in Fig. 4, to the right. The edge of said plate 60 is adapted to strike against the stud 39 (see Fig. 1) projecting out from the lower arm 36 of the traveler and rock said traveler on its supporting-rod 101 and cause the half-nut 35' to be disengaged from the screw-threaded shaft 37 and the half-nut 62 to engage with the screw-threaded shaft 3. At the same time the hook-arm 63, extending out from a hub 63' loose on the rod 101 and connected with the slide 58 by an arm 115, is moved to the right and engages the stud 34, extending out from the sleeve 40, and rocks the said sleeve and causes the half-nut portion 43, through link 44, to engage the screw-threaded shaft 3 and the gripping-jaw 1 to be closed to grip the wire, as shown at the left in Fig. 7.

It will be understood that a half-revolution of the cam 57 in the opposite direction will move the slide 58 to the left to operate the other traveler supported on the rod 35 at the proper time.

We may combine with the several parts of our machine above described means for cutting the wire, after it has been swaged, into separate lengths or spokes, which may be of any ordinary and well-known construction and operated in unison with the other parts of our machine, so as not to interfere with the continuous drawing of the wire through the swaging-machine.

We have shown in the drawings (see Figs. 1, 2, and 3) a cam 121, fast on the shaft 29, which operates a slide 122, which slide is supported in ways 124 and acts to cut the wire by a shear-cut or otherwise, as desired, by mechanism not shown.

From the above description, in connection with the drawings, the operation of our machine for making swaged-wire bicycle-spokes from a continuous wire will be readily understood by those skilled in the art, and is briefly as follows: The wire 116 (see Fig. 2) is first drawn through the hollow shaft of the swaging-machine, and passes between the swaging-dies and is gripped and held in the gripping-jaws of one of the travelers, which traveler should preferably be at the swaging end of the machine. Power is now applied and the machine is put into operation.

It will be understood that power is preferably applied to the pulley on the swaging-machine shaft for operating the swaging portion of the machine, and power is also applied to a pulley (not shown) for operating the other parts of the machine, which act to draw the wire through the swaging-machine and open and close the swaging-dies.

The traveler gripping the wire, as above described, is carried along to the right, Fig. 1, by the screw-shaft 3, operated in the manner above described, until a proper length of the wire is swaged to form the swaged portion of the spoke. The traveler is then operated by the mechanism above described to release the wire and disengage itself from the screw-threaded shaft 3 and engage with the screw-threaded shaft 37. Simultaneously with said movement of the traveler the swaging-dies are moved apart or opened by the wedge mechanism to allow of the full size of the wire being drawn through the swaging-machine between the dies without being swaged; also, simultaneously, the gripping device which grips the wire to draw it through the swaging-machine during the cessation of the swaging operation is operated to grip the wire and move away from the swaging-machine to draw the wire through the same; also, simultaneously, the other traveler, which is now at the swaging end of the machine, is operated to be disengaged from the screw-threaded shaft 37 and engage the screw-threaded shaft 3, and grip the wire to be drawn through the swaging-machine by said traveler for another swaging operation.

All of the several parts of the machine are operated in proper time and almost simultaneously, so that the machine operates continuously, and the drawing of the wire through the swaging-machine is continuous and without any intermission.

By providing our machine with two travelers which grip the wire and draw it through the swaging-machine during the swaging operation, and also with a third gripping device which draws the wire through the swaging-machine during the cessation of the swaging operation, there is no delay in the operation of the machine, for as soon as one of the travelers has reached the end of its travel away from the swaging-machine, and the unswaged portion of the wire has been drawn through the swaging-machine, the other traveler grips the wire and draws it through the swaging-machine. In this way we are enabled to swage more wire in a given time than in case the machine was operated intermittently and only one traveler used to draw the wire through the swaging-machine.

It will be understood that the details of construction of the several parts of our machine shown in the drawings and above described may be varied somewhat, if desired.

We have used the term "continuous wire" in our description. We mean by this wire long enough to make more than one spoke. The wire may be taken from a reel or from separate lengths of wire, as desired.

It will be understood that we do not limit our invention to the swaging of wire bicycle-spokes, as any other kind of spokes may be swaged, or wire may be swaged for any purpose desired.

Having thus described our invention, what we claim as new, and desire to secure by Letters Patent, is—

1. In machinery for making swaged wire bicycle spokes from a continuous wire, the combination with the swaging mechanism, of mechanism for gripping and drawing the wire through the swaging mechanism during the swaging operation, mechanism for moving apart the swaging dies to allow the wire to be drawn through the swaging mechanism without being swaged, mechanism for gripping and drawing the wire through the swaging mechanism during the cessation of the swaging operation, and mechanism for moving toward each other the swaging dies to continue the swaging operation, and means for operating said mechanisms in proper order, to continuously draw the wire through the swaging mechanism, substantially as set forth.

2. In automatic machinery for manufacturing swaged wire bicycle spokes from a continuous wire, the combination with mechanism for swaging the wire, and means for operating said mechanism, of mechanism for gripping the wire, and drawing it through the swaging mechanism during the swaging operation, mechanism for moving apart the swaging dies to allow the wire to be drawn through the swaging mechanism without being swaged, mechanism for gripping and drawing the wire through the swaging mechanism during the cessation of the swaging operation, to leave the full size of the wire for the ends of the spokes, mechanism for moving together the swaging dies to continue the swaging of the wire to form the reduced body portion of the spoke between the ends thereof, and means for automatically operating said several mechanisms in proper order to continuously draw the wire through between the swaging dies, substantially as set forth.

3. In automatic machinery for manufacturing swaged wire spokes from a continuous wire, the combination with mechanism for swaging the wire, and means for operating said mechanism, of two separate mechanisms for gripping the wire and drawing it through the swaging mechanism, during the swaging operation, and mechanism for moving apart the swaging dies to allow the wire to be drawn through the swaging mechanism without being swaged, mechanism for gripping and drawing the wire through the swaging mechanism during the cessation of the swaging operation, to leave the full size of the wire for the ends of the spokes, mechanism for moving together the swaging dies to continue the swaging of the wire to form the reduced body portion of the spokes, between the ends thereof, and means for automatically operating said several mechanisms in proper order, to continuously draw the wire through the swaging mechanism, to swage a portion thereof, and leave a portion unswaged, for the purpose stated, substantially as set forth.

4. The combination with the swaging mechanism, of mechanism for gripping the wire to be swaged, mechanism for giving motion to said gripping mechanism to draw the wire through between the swaging dies when the dies are closed, mechanism for operating the gripping mechanism to cause it to release the wire and return toward the swaging mechanism, mechanism for opening and closing the swaging dies, a second mechanism for gripping the wire, and mechanism for giving motion to said gripping mechanism to draw the wire through between the swaging dies when the dies are open, and a third gripping mechanism for gripping the wire when the dies are closed, and mechanism for giving motion to said gripping mechanism to draw the wire through between the closed dies, said third gripping mechanism alternating in operation with the first mentioned gripping mechanism, one moving away from the swaging mechanism while the other moves toward the swaging mechanism, so that the wire is drawn continuously through between the swaging dies, and means for automatically operating the several mechanisms in their proper order, substantially as set forth.

5. In machinery for swaging wire in continuous lengths, and adapted to swage a portion of the wire and leave a portion unswaged, the combination with swaging mechanism, and mechanism for opening and closing the swaging dies at regular intervals, to allow a portion of the wire to pass through between the dies without being swaged, of means for drawing the wire continuously between the swaging dies, said means consisting of mechanism for gripping the wire, and mechanism for giving motion to said gripping mechanism to move the same away from the swaging mechanism, and draw the wire through between the swaging dies when said dies are opened, said gripping mechanism after drawing the wire through between the open dies releasing the wire and returning to its first position, preparatory to again gripping the wire and drawing it through at the proper time, mechanism for gripping the wire and drawing it through between the swaging dies when said dies are closed, said mechanism consisting of a pair of travelers, each of said travelers supported and adapted to move on a rod away from, and toward the swaging mechanism, and provided with jaws or gripping surfaces for gripping the wire, and operated at the proper time to grip the wire and engage a screw threaded shaft to be moved away from the swaging mechanism, to draw the wire through between the closed swaging dies, and also operated at the proper time to release the wire and engage a screw threaded shaft and be returned toward the swaging mechanism, said travelers operated alternately to grip and draw the wire through between the closed swaging dies, so that when one reaches the limit of its travel away from the swaging mechanism, preparatory to releasing the wire, the other has reached the limit of its travel toward the swaging machine, preparatory to the gripping of the wire, and means for operating said travelers, substantially as set forth.

6. In machinery for swaging wire in continuous lengths, the combination with the swaging mechanism, and means for opening and closing the swaging dies at regular intervals, to allow a portion of the wire to be drawn through between the dies without being swaged, of means for drawing the wire through between the swaging dies when the dies are closed, consisting of two devices operating alternately to grip and release the wire, and mechanism for operating said devices to cause one to grip the wire and the other to release the wire, and one to be moved away from the swaging mechanism and the other to be moved toward the swaging mechanism, for the purpose stated, substantially as set forth.

7. The combination with swaging mechanism, of means for drawing the wire continuously through between the swaging dies during the swaging operation, consisting of two travelers, provided with gripping devices, each of said travelers supported and adapted to move on a rod, and provided with screw threaded portions adapted to engage with revolving screw threaded shafts, to be moved away from the swaging mechanism, or toward the swaging mechanism, one traveler moving away from the swaging mechanism as the other traveler moves toward the swaging mechanism, and mechanism for operating said travelers to cause them to grip the wire at the end of their travel toward the swaging mechanism, and engage a screw threaded shaft to be moved away from the swaging mechanism, and also to release the wire at the end of their travel away from the swaging mechanism, and to engage a screw threaded shaft to be moved toward the swaging mechanism, for the purpose stated, substantially as set forth.

8. In a swaging machine, the combination with the swaging dies, and mechanism for actuating the dies to swage the wire, of mechanism for automatically opening the swaging dies, to allow the wire to be drawn through without swaging, and for closing the swaging dies to swage the wire, said mechanism consisting of wedges provided with yoke shaped outer ends to engage a flange on a gear, and said gear mounted and adapted to rotate on a screw on the stationary part of the swaging mechanism, and said screw, and means for operating the gear engaging said yoke shaped ends, to cause the wedges to be pushed in or withdrawn, for the purpose stated, substantially as set forth.

9. In machinery for swaging wire, the combination with the swaging mechanism, of mechanism for gripping the wire to draw it through between the swaging dies, consisting of a hub adapted to slide on a supporting rod and also have a partial rotation on said rod, and provided with a rigid arm extending up therefrom, provided with a half nut portion adapted to engage, in connection with a half nut portion hinged on said arm, a screw threaded shaft, and a stationary jaw or gripping surface at the upper end of said arm, a rigid arm extending out from the lower portion of said hub, provided with a half nut portion adapted to engage a second screw threaded shaft, and a sleeve mounted on said hub and adapted to move with said hub, and to have an independent rotary motion thereon, a link connecting said sleeve with the outer end of a lever pivoted on the upwardly extending arm of the hub, and said lever carrying at its inner end the movable jaw or gripping surface, for gripping the wire, substantially as set forth.

10. The combination with mechanism for gripping the wire to be drawn through a swaging machine, consisting of a hub adapted to slide on a supporting rod, and to have a partial rotation thereon, and having a rigid arm extending up therefrom provided with a half nut portion adapted to engage, in connection with a half nut portion hinged on said arm, a screw threaded shaft, and a stationary jaw or gripping surface at the upper end of said arm, a rigid arm extending out from the lower portion of said hub, provided with a half nut portion adapted to engage a second screw threaded shaft, and a sleeve mounted on said hub, and adapted to move with said hub, and to have an independent rotary motion thereon, a link connecting said sleeve with the outer end of a lever pivoted on the upwardly extending arm of said hub, and said lever, carrying at its inner end the movable jaw or gripping surface, for gripping the wire, of means for operating said gripping mechanism, to cause it to have a partial rotation on its supporting rod in one direction to grip the wire, and in the opposite direction to release the wire, substantially as set forth.

EDWIN J. WATSON.
     EDWIN W. VAUGHAN.

Witnesses:
 JOHN C. DEWEY,
 KATIE FARRELL.